United States Patent [19]

Potts, Jr. et al.

[11] Patent Number: 5,120,338
[45] Date of Patent: Jun. 9, 1992

[54] METHOD FOR SEPARATING A MULTI-COMPONENT FEED STREAM USING DISTILLATION AND CONTROLLED FREEZING ZONE

[75] Inventors: William A. Potts, Jr., Houston; Eugene R. Thomas, Midland, both of Tex.

[73] Assignee: Exxon Production Research Company, Houston, Tex.

[21] Appl. No.: 669,167

[22] Filed: Mar. 14, 1991

[51] Int. Cl.⁵ .................................. F25J 5/00
[52] U.S. Cl. ............................................ 62/12
[58] Field of Search ....................... 62/12, 13, 18, 20

[56] References Cited

U.S. PATENT DOCUMENTS

| | | | |
|---|---|---|---|
| 4,308,043 | 12/1981 | Yearout | 62/13 |
| 4,451,275 | 5/1984 | Vines et al. | 62/28 |
| 4,533,372 | 8/1985 | Valencia et al. | 62/12 |
| 4,664,686 | 5/1987 | Pahade | 62/24 |
| 4,923,493 | 5/1990 | Valencia et al. | 62/13 |
| 5,062,270 | 11/1991 | Haut et al. | 62/20 |

OTHER PUBLICATIONS

R. C. Haut, R. D. Denton, E. R. Thomas, "Development and Application of the Controlled-Freeze-Zone Process," Aug. 1989, pp. 265–271, SPE Production Engineering.

E. R. Thomas, R. D. Denton, "Conceptual Studies Using the Controlled Freeze Zone (CFZ) Process," Aug. 1987, Paper No. 6d, AIChE Summer National Meeting.

R. Wuensche, "Nitrogen Removal and Raw Helium Recovery in Natural Gas Processing Plants,", Jul. 1975, pp. 443–449, Proceedings of Cryogenic Engineers Conference.

M. Streich, "N2 Removal from Natural Gas," Apr. 1970, pp. 86–88 Hydrocarbon Processing.

*Primary Examiner*—Ronald C. Capossela
*Attorney, Agent, or Firm*—Keith A. Bell

[57] ABSTRACT

The invention relates to a method for separating two primary components of a multi-component feed stream (e.g., methane and nitrogen) in the presence of a third, freezable component (e.g., carbon dioxide) having a relative volatility less than that of either primary component. The inventive process employs both a distillation section and a controlled freezing zone ("CFZ"). The freezable component is allowed to freeze in the CFZ, and the resulting solids are collected at the bottom of the CFZ. The CFZ also produces a vapor overhead product enriched in one of the primary components and a liquid bottom product enriched in the other primary component. The solids of the freezable component are melted and mixed with the CFZ liquid bottom product to form a liquid feed stream for the distillation section which operates like a conventional distillation section, while tolerating significantly high concentrations (i.e., >0.1 mole %) of the freezable component without solids formation, at temperatures well below the freezable component's freezing point.

24 Claims, 2 Drawing Sheets

METHOD FOR SEPARATING A MULTI-COMPONENT FEED STREAM USING DISTILLATION AND CONTROLLED FREEZING ZONE

FIELD OF THE INVENTION

This invention relates to a method for separating a multi-component feed stream using distillation and a controlled freezing zone. In a preferred embodiment, the invention pertains to a method for separating methane as a liquid from a multi-component feed stream containing a freezable component, such as carbon dioxide.

BACKGROUND OF THE INVENTION

Cryogenic separation is frequently used to separate substances having low boiling points from one another. Examples of such cryogenic separations include the separation of air into its various components, the production of synthetic gas, and nitrogen rejection from natural gas. A primary limitation of cryogenic separation processes is that they can tolerate, at most, only trace amounts of a freezable component in the feed stream. Concentrations of a freezable component in the feed stream greater than trace amounts would likely result in freezing of the freezable component and plugging of the separation tower.

Diluent gases such as nitrogen and helium are often present in natural gas. The presence of these diluent gases reduces the heating value of the natural gas. Also, certain of these diluent gases may have independent commercial uses if they can be separated from the natural gas. For example, helium is used in the space and superconductor industries. Consequently, the separation of diluent gases from natural gas may have twofold economic benefit, namely, enhancement of the natural gas heating value and production of a marketable gas such as helium. Traditionally, cryogenic processing has been used to separate such diluent gases from natural gas.

One example of a traditional cryogenic process is a nitrogen rejection unit (NRU). Conventional NRU technology requires that $CO_2$ concentrations in the natural gas feed stream be reduced to 10 to 1,000 parts per million (ppm) to avoid column plugging with solid $CO_2$. The proposed invention is capable of accommodating significantly higher $CO_2$ concentrations (i.e., up to about 3 mole %) in the feed stream without column plugging or significant loss of process efficiency.

Two NRU processes which are able to perform adequately over a broad range of nitrogen/methane ($N_2/CH_4$) inlet compositions include the single-column heat-pumped cycle and the double-column cycle. Both of these processes are discussed in "Upgrading Natural Gas" by H. L. Vines, Chemical Engineering Progress, November 1986, pp. 47-49.

In a single-column process, the feed stream to the distillation column is precooled with a heat exchanger and then flashed (i.e., ultra fast liquid to vapor conversion) to column pressure. Once the flashed feed stream is introduced to the distillation column, $N_2$ is removed overhead while $CH_4$ with some $N_2$ is condensed in the liquid bottoms stream and reboiled by a heat pump (i.e., a closed-loop methane circulation system). While several hundred ppm $CO_2$ concentrations in the feed stream may be tolerated, the stream must be maintained at sufficiently high pressure and temperature to avoid solid $CO_2$ formation. Therefore, much of the work done by the heat pump is used to separate out $N_2$ at a high pressure. However, if there is no immediate use for high-pressure $N_2$ the single-column heat-pumped cycle would be less efficient than the double column cycle discussed below.

In a double-column cycle, the $N_2$ is separated with two sequentially placed columns: a high pressure column followed by a low pressure column. The bulk of the separation is performed in the low pressure column at lower temperatures. Although this process cycle is more energy efficient than the single-column cycle because of this low pressure separation step, it can tolerate only trace levels (i.e., 20 ppm or less) of $CO_2$ in the feed stream without solids formation. Thus, the single-column cycle offers the advantage of tolerating $CO_2$ concentrations up to several hundred ppm but at significantly greater energy costs; while the double-column cycle offers the advantage of a more energy efficient $N_2$ separation but at a substantially lower tolerance for $CO_2$ in the feed stream.

A double-column cycle taught by Phade et al., U.S. Pat. No. 4,644,686, "Process to Separate Nitrogen and Methane", allows cost effective $N_2$ separation but requires a complex array of process steps. Additionally, even with Phade's modifications, the double-column cycle cannot tolerate $CO_2$ concentrations greater than a few hundred ppm.

None of the NRU processes described above can tolerate $CO_2$ concentrations in the feed stream greater than a few hundred ppm. Often, this necessitates expensive pretreatment steps to reduce the $CO_2$ concentration to an acceptable level. Accordingly, a need exists for a distillative separation process which can minimize the number of processing steps by increasing the tolerance of higher concentrations of freezable components, such as $CO_2$, in the feed stream. The present invention satisfies that need.

The present invention extends the scope of the controlled freeze zone technology, disclosed by Valencia et al. in U.S. Pat. No. 4,533,372. As described in that patent, the CFZ process permits separation of a freezable component (e.g., $CO_2$ or other acid gases), as well as components with lower relative volatility than the freezable component (e.g., butane), from components with higher relative volatility than the freezable component (e.g., $CH_4$, $N_2$, etc.).

The present invention demonstrates how significant amounts of a freezable component(s) can be tolerated in a distillation in which the primary separation is between components more volatile than the freezable component(s). A single column NRU is used as an example to show one possible implementation of the invention. However, the invention may also be used in the double-column mode. In either mode the invention demonstrates an orders of magnitude higher tolerance for $CO_2$ in the feed stream than conventional NRU technology.

It should be noted that relative volatility of the feed stream's components will vary depending upon feed stream composition and the column's temperature and pressure conditions. Consequently, as used herein, "relative volatility" means the comparative volatility of the feed stream components as determined with respect to the feed stream's composition under the temperature and pressure conditions of the distillation column.

SUMMARY OF THE INVENTION

This invention relates generally to a separation process in which the primary separation is between two components more volatile than a third, freezable component. For illustrative purposes, it will be assumed that the primary separation is between $N_2$ and $CH_4$ and that the third, freezable component is $CO_2$.

The inventive process employs both a distillation section and a controlled freezing zone ("CFZ"). The method of the invention entails at least two steps. The first step comprises maintaining a distillation section engineered to produce a freezing zone vapor feed stream and a liquid bottom product stream enriched in one of the two primary components. [Note: Feed stream as used herein may connote either an internal or external feed stream.] The second step comprises maintaining a CFZ engineered to contact the freezing zone vapor feed stream with at least one liquid feed stream to produce a freezing zone vapor product stream enriched in the other of the two primary components. The distillation zone, not including the CFZ, may be similar to those currently used in the art. The CFZ is designed to isolate solids formation and melting in an open region of the tower so as to avoid tower plugging.

The proposed separation process is suitable for a natural gas feed stream containing small as well as relatively large (i.e., greater than 0.1 mole %, but less than an empirically determined critical mole percentage, as discussed below) freezable component concentrations. Some freezable components which may be selectively removed in a CFZ while separating $CH_4$ as a liquid from a component with higher relative volatility than $CH_4$ (e.g., $N_2$) include $CO_2$, $H_2S$, benzene, and other higher hydrocarbons having lower relative volatility than $CH_4$.

The proposed process may be used on a stand alone basis for a dried gas stream from a wellhead or may be used as an add-on to other physical or chemical processes.

BRIEF DESCRIPTION OF THE DRAWINGS

The steps of the present invention will be better understood by referring to the following detailed description and the attached drawings in which.

Figure 2:
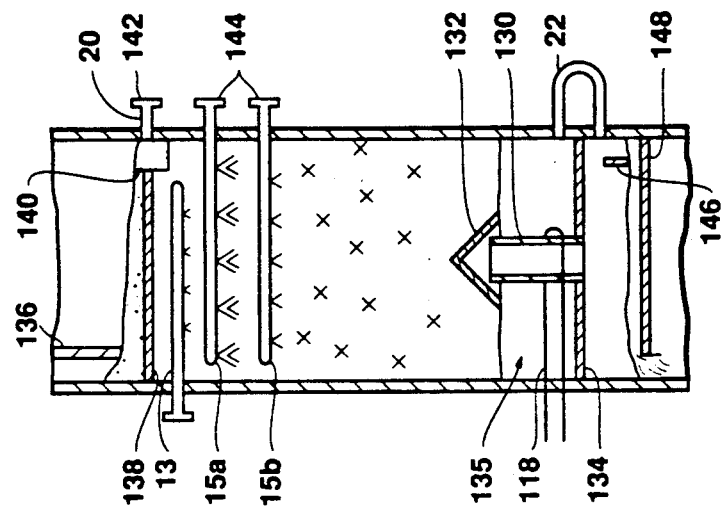
FIG. 2 is a cross-sectional view of the controlled freezing zone of the process unit shown in FIG. 1.

While the invention will be described in connection with its preferred embodiments, it will be understood that the invention is not limited thereto. On the contrary, it is intended to cover all alternatives, modifications, and equivalents which may be included within the spirit and scope of the invention.

DESCRIPTION OF THE PREFERRED EMBODIMENTS

As mentioned previously, conventional methods for the cryogenic distillation of $N_2$ from a natural gas feed stream containing $N_2$, $CH_4$, and $CO_2$ involve pretreating the feed stream to reduce the $CO_2$ concentration to a trace level so as to prevent formation of $CO_2$ solids in the distillation column. Alternatively, the distillation process of the present invention accomplishes separation of $N_2$ from a natural gas feed stream with up to about 3 mole % $CO_2$ present, thereby reducing or eliminating the pretreatment requirement.

The invention will be described herein in connection with the separation of $N_2$ from a feed stream containing at least $CO_2$, $CH_4$, and $N_2$. However, it should be understood that this is for purposes of illustration and not by way of limitation. The invention may be used to accomplish the primary separation of any two high volatility components from a feed stream which also contains a third, freezable component having a lower relative volatility than either of said high volatility components. The freezable component is typically $CO_2$, $H_2S$, or another acid gas, although any component having a tendency to form solids in the tower's freezing zone may be a freezable component. All such applications are within the scope of the present invention which is limited only by the appended claims.

The maximum freezable component concentration in the tower feed stream which can be tolerated is called the critical mole percentage (CMP). The CMP is a function of the feed stream composition, the chemical character of the freezable component, product specifications, and the column temperature and pressure. Typically, the CMP for a particular application would be determined empirically through the use of commercially available process simulation software, as more fully described below. Alternatively, the CMP can be determined experimentally by increasing the $CO_2$ concentration in the column feed stream until freezing occurs. Any freezable component concentration in excess of the empirically determined CMP will lead to freezing of the freezable component (e.g., $CO_2$) outside the CFZ section. The CMP, therefore, represents the maximum freezable component concentration in the tower feed stream which may be tolerated without causing solids build-up problems in the tower.

A preferred embodiment of the proposed $N_2$/$CH_4$ separation process would treat a dried natural gas multi-component feed stream chilled to $-135°$ F. at 960 psia and containing up to about 3 mole % $CO_2$. Tower feed streams containing greater than 3 mole % $CO_2$ may be passed through a bulk pretreatment (e.g., a $CO_2$ gas permeation membrane) to reduce $CO_2$ to an operable level.

Figure 1:
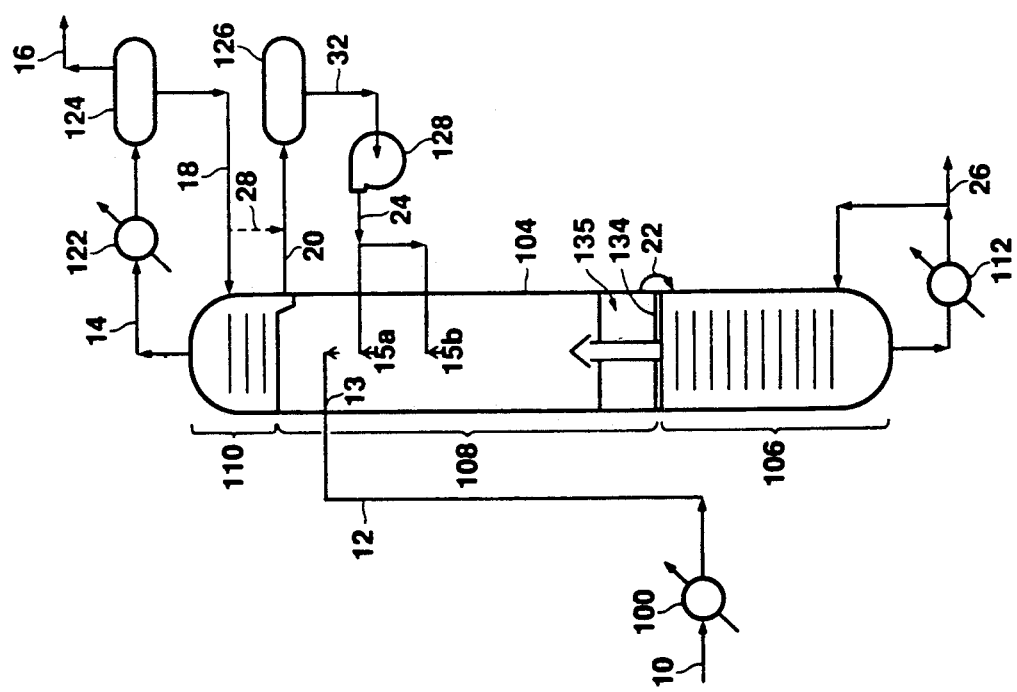
FIG. 1 is a schematic diagram of an example process unit using the proposed inventive process for separating $N_2$ from a feed stream containing $N_2$, $CH_4$, and $CO_2$.

Referring now to FIG. 1, the splitter tower 104 is preferably comprised of three distinct sections, a lower distillation section 106, a middle freezing zone 108, and an upper distillation section 110. However, as discussed below, upper distillation section 110 is not required for practice of the present invention.

In the following description, it will be assumed for purposes of illustration that the tower feed stream contains 2.5 mole % $CO_2$, 27.0 mole % $N_2$, 70.0 mole % $CH_4$, and 0.5 mole % other compounds, including $H_2S$ and higher hydrocarbons (e.g., benzene). The multi-component feed stream 10 is fed to a precooler (i.e., indirect heat exchanger) 100 for chilling to approximately $-135°$ F. At $-135°$ F. and 960 psia, the tower feed stream is liquid. This high pressure feed stream is introduced into the splitter tower 104 through line 12 feeding spray nozzles 13. It is contemplated that other feed sites and/or other phases of the feed stream may be used. For instance, a feed stream may be introduced into the lower portion of the freezing zone 108 as a vapor or as a liquid at the chimney tray 134 or as a gas/liquid mixture at the spray nozzles 13 or as a liquid at the lower distillation section 106.

The lower distillation section 106 is fed a $CH_4/CO_2/N_2$ liquid collected and formed at chimney tray 134 by line 22. Typically, lower distillation section 106 contains conventional vapor-liquid contact devices or packing to enhance separating the $CH_4$ and $CO_2$ liquid (i.e., liquid bottom product stream) from $N_2$ vapor formed in the lower distillation section 106. Additionally, a baffle 146 (see FIG. 2) may be used at the discharge of line 22 to permit formation of a relatively undisturbed liquid level on upper tray 148 of the lower distillation section 106. The liquid bottom product stream is heated in reboiler 112 and a portion is returned to the lower distillation section 106 as reboiled vapor (i.e., reboiled vapor feed stream). The remaining portion leaves the process as a product via line 26.

The middle freezing zone 108 is maintained at 400 psia and is fed a multi-component stream sprayed by feed spray nozzles 13. The high pressure (i.e., 960 psia) feed stream thereby undergoes a sudden expansion which lowers the feed stream temperature to approximately $-171°$ F. and its pressure to about 400 psia. Additionally, as will be more fully described below, $CH_4/N_2$ liquid is simultaneously sprayed by return feed spray nozzles 15a and 15b into the freezing zone 108. These combined feed and $CH_4/N_2$ sprays help induce formation of solid $CO_2$ from the $CH_4/N_2/CO_2$ vapor rising from the chimney tray 134, located at the bottom of the freezing zone 108.

As illustrated in FIG. 2, the chimney tray assembly 135, which includes a central chimney 130, a chimney cap 132, and a chimney tray 134, serves to collect the falling liquid (i.e., freezing zone liquid product stream) and precipitating solid $CO_2$ produced in the freezing zone 108. The central chimney 130 allows vapor from the lower distillation section 106 to enter the freezing zone 108 while the chimney cap 132 prevents solids formed in the freezing zone 108 from entering the lower distillation section 106 before melting in the chimney tray 134. A level of liquid enriched in $CH_4$ and $CO_2$ is maintained in the chimney tray 134 by controlling the rate of flow in line 22. Although it is preferable that no $CO_2$ solids reach lower distillation section 106, it is possible that lower distillation section 106 could process a slurry containing small amounts of solid $CO_2$ without plugging.

Ideally, no additional heat should be required to maintain a liquid state at the chimney tray 134. However, a heater 118 may be employed to ensure no solids leave the chimney tray via line 22 feeding the lower distillation section 106.

Alternatively, a heater (not shown) may be used to warm line 22 to melt any solids before reaching the lower distillation section 106. Yet another alternative may employ an elongated chimney cap 132 having a skirt extending into the liquid/solids mixture held by the chimney tray 134. This would cause the vapor rising from lower distillation section 106 (see below) to pass through the liquid/solids mixture thereby transferring heat to the mixture. The elongated chimney cap is disclosed in fuller detail in copending U.S. patent application Ser. No. 07/593,701) entitled "Bubble Cap Tray for Melting Solids and Method for Using Same" filed Oct. 5, 1990.

In addition to the feed stream fed by spray nozzles 13, $CH_4/N_2/CO_2$ vapors (i.e., freezing zone vapor feed stream) formed in the lower distillation section 106 rise to the freezing zone 108 by the central chimney 130. Once in the freezing zone 108, the rising vapor contacts small liquid droplets formed by feed stream and return feed spray nozzles 13 and 15a, 15b, respectively. The rising vapor phase will yield $CO_2$ solids from and $CO_2$ escaping the lower distillation section 106 with rising vapor. Leavng the freezing zone 108, the freezing zone vapor product stream is enriched with $N_2$ and has reduced concentrations of $CO_2$ and $CH_4$ relative to the tower feed stream's concentrations of these components. Three distinct phases are maintained in the CFZ. In this specific CFZ application, the vapor phase is enriched with $N_2$ and the liquid phase is enriched with $CH_4$ relative to the tower feed stream, while the solids produced are comprised exclusively of $CO_2$.

The control of the freezing zone 108 is based on a variety of tower conditions including temperature and liquid level at the chimney tray 134, temperature at the feed steam and return feed spray nozzles 13 and 15a, 15b, temperature at the reflux condenser 122 (described below), and the reflux return flow rate through line 18.

Specific details regarding freezing zone control are provided in U.S. Pat. No. 4,533,372 as follows:

[I]t is contemplated that control of the controlled freezing zone may be based on several temperatures and liquid levels. First, the temperature at the bottom of the controlled freezing zone liquid layer found on chimney tray [134] should be maintained within a few degrees (about 5° F.) above the highest temperature at which carbon dioxide can freeze at the operating column pressure. This is achieved by adding heat to the liquid near the bottom of the controlled freezing zone by heater [118] as necessary. Second, the liquid level at the bottom of the controlled freezing zone is maintained at a constant predetermined depth by adjusting the flow rate of the stream flowing in line 22. Third, the temperature at the top spray [i.e. reflux spray 15a and 15b] is maintained a few degrees colder (around 3° to 5° F.) than the coldest temperature at which carbon dioxide can freeze under the operating column pressure. Finally, the proper control of the overhead product purity in line 14 (see FIG. [1]), as well as that of the temperature at the top of the controlled freezing zone, is achieved by setting the overhead product temperature through reflux condenser 122 and by adjusting the reflux rate through line 18. It should be apparent that the flow to the sprays is directly related to the reflux rate. [Column 7, line 47 through Column 8, line 2]

Optimum operation of the freezing zone requires the freezing zone liquid feed stream to be at conditions which may be close to, but not quite at, $CO_2$ solidification conditions. U.S. Pat. No. 4,923,493 disclosed a simple method and apparatus for optimizing and controlling the solidification conditions of $CO_2$ in the freezing zone liquid feed stream lines. Generally, the method involves sub-cooling the freezing zone liquid feed stream by adding portions of colder reflux. The reflux liquid may be introduced into the freezing zone liquid feed stream at line 20 with a line by-passing the upper distillation section and teeing off reflux liquid return line 18 (see dashed line 28). Introducing a portion of the tower's reflux liquid into the freezing zone liquid feed stream supply line 20 results in a sub-cooled freezing zone liquid feed stream which remains away from solidification until sprayed into the freezing zone. Although the by-pass line 28 is optional, it does provide some operational advantages in tower start-up and CFZ control. Alternatively, the freezing zone liquid feed stream may be sub-cooled by indirect cooling means (not shown).

Referring to FIG. 2, the $CH_4/N_2/CO_2$ vapor (i.e., freezing zone vapor product stream) enters the upper distillation section 110 through the section's bottom tray 138. As is well known to one skilled in the art, tray 138 is permeable to the rising vapor. The vapor rising through the tray prevents liquid from falling through the tray's openings while providing a surface for vapor-liquid contact. The upper distillation section 110 also contains conventional vapor-liquid contact devices or packing to enhance separating $CH_4$ and any remaining $CO_2$, each as a liquid from $N_2$ vapor. The downcomer 136 facilitates formation of a liquid layer on the upper section bottom tray 138. Additionally, tray 138 has an appropriate bubble or foam producing device (not shown) which ensures contact between the falling liquid and rising vapor. The downcomer area of the tray 138, however, is sealed to prevent the section's falling liquid from freely entering the freezing zone 108. Tray 138 also has a weir 140 to help maintain a level of liquid sufficient for feeding line 20 (see FIG. 2). The $CH_4$-rich liquid leaves the upper distillation section 110 through flanged connection 142 attached to line 20. The liquid is transferred subsequently to an accumulator vessel 126 by line 20 and returned to the freezing zone 108 by line 32 using pump 128 and return feed spray nozzles 15a, 15b which are connected to line 24 through flanged connections 144 (see FIG. 2). As the vapor leaves the upper distillation section 110 through line 14 (i.e., vapor overhead product stream), it is $N_2$-rich with some $CH_4$ present.

The vapor leaving the upper distillation section 110 through line 14 is partially condensed in reflux condenser 122 and is separated into liquid and vapor phases in reflux drum 124. Liquid from reflux drum 124 is returned to the upper distillation section 110 by line 18 (i.e., reflux liquid feed stream). Also, as discussed above, a portion of the reflux liquid may be introduced into line 20 via line 28 to sub-cool the freezing zone liquid feed stream. The vapor from reflux drum 124 is taken off as a predominantly $N_2$ product in line 16.

It is contemplated that in certain circumstances, the upper distillation section may be needed or desired. In such an instance, a portion of the vapor leaving the freezing zone 108 (i.e., freezing zone vapor product stream) would be condensed and returned as liquid feed (i.e., freezing zone liquid feed stream) to return feed spray nozzles 15a, 15b. The remaining portion would be taken as vapor overhead product containing predominantly $N_2$.

Figure 3:
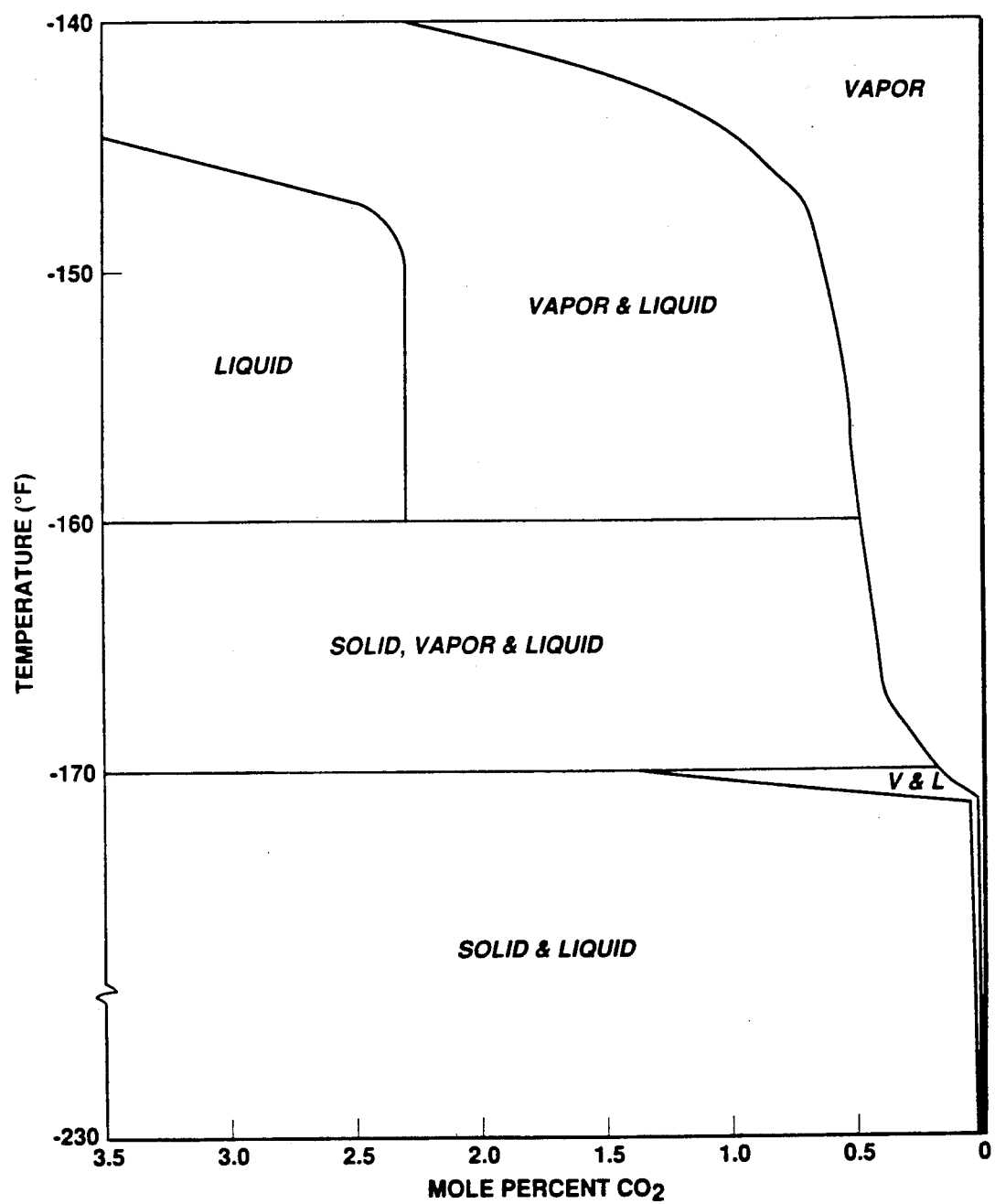
FIG. 3 is a phase diagram for a natural gas feed stream comprised of $CH_4$ (70.0 mole %), $CO_2$ (2.5 mole %), $N_2$ (27.0 mole %), and a combination of $H_2S$ and other hydrocarbons (0.5 mole %) as a function of temperature and at a pressure of 400 psia.

FIG. 3 is a phase diagram of a natural gas feed stream at 400 psia containing approximately 2.5 mole % $CO_2$, 27 mole % $N_2$, and 70 mole % $CH_4$. This diagram generally illustrates the formation of the different phases that develop for the feed stream's respective components with changing temperature and concentration of $CO_2$ and non-$CO_2$ component throughout the tower. The tower's temperature gradient runs approximately from $-145°$ F. in the bottoms to $-230°$ F. at the overhead. This gradient reads from top to bottom on the phase diagram. Also, the tower's $CO_2$ concentration gradient runs approximately from 3.5 mole % in the bottoms to zero mole % at the overhead. This gradient reads from left to right on the phase diagram. With the change in component concentrations at various points along the tower's temperature gradient comes commensurate changes in the phases (e.g., solid/vapor, vapor/liquid, etc.) which are in equilibrium with each other. Development of these phases, in turn, allows separating those components having a tendency to concentrate in one phase more than another.

For the same feed stream and tower conditions identified above, Table I below provides an approximate characterization of the temperature versus component concentrations in the vapor and liquid phases at equilibrium at various stages throughout the tower 104. This temperature-concentration profile was made using a proprietary computer program based on well-known chemical engineering principles. However, similar results could be obtained through the use of commercially available software such as ASPEN PLUS, which is marketed by ASPEN Technology.

TABLE I

| Stage | Temperature (°F.) | Vapor (Mole Fraction) | | | | Liquid (Mole Fraction) | | | |
|---|---|---|---|---|---|---|---|---|---|
| | | CH4 | >CH4** | N2 | CO2 | CH4 | >CH4** | N2 | CO2 |
| Condenser | −229.0 | .1000 | 0 | .9000 | 0 [1] | .2506 | 0 | .7494 | 0 |
| 2 | −212.8 | .2159 | 0 | .7841 | 0 | .5043 | 0 | .4957 | 0 |
| 3 | −192.9 | .3923 | 0 | .6077 | 0 | .7156 | 0 | .2844 | 0 |
| 4 | −179.9 | .5326 | 0 | .4675 | 0 | .8102 | 0 | .1898 | 0 |
| 5 | −174.4 | .5979 | 0 | .4021 | 0 | .8445 | 0 | .1555 | 0 |
| 6 | −172.4 | .6225 | 0 | .3775 | 0 | .8563 | 0 | .1436 | 0 |
| 7 | −171.7 | .6311 | 0 | .3689 | 0 | .8602 | 0 | .1395 | .0003 |
| 8 | −171.4 | .6338 | 0 | .3660 | .0002 | .8604 | 0 | .1380 | .0015 |
| 9 | −171.0 | .6332 | 0 | .3657 | .0011 | .8557 | .0004 | .1372 | .0068 |
| (CFZ) 10 | −167.7 | .6568 | .0002 | .3394 | .0036* | .8515 | .0029 | .1229 | .0227* |
| (CFZ) 11 | −164.0 | .7035 | .0002 | .2922 | .0040* | .8711 | .0029 | .1033 | .0227* |
| (CFZ) 12 | −160.2 | .7551 | .0002 | .2402 | .0045* | .8915 | .0029 | .0828 | .0228* |
| 13 | −156.4 | .8072 | .0003 | .1876 | .0049 | .9110 | .0029 | .0633 | .0228 |
| 14 | −152.9 | .8562 | .0003 | .1382 | .0054 | .9285 | .0029 | .0459 | .0228 |
| 15 | −149.9 | .8989 | .0003 | .0949 | .0058 | .9432 | .0029 | .0311 | .0229 |
| 16 | −147.4 | .9338 | .0003 | .0594 | .0065 | .9536 | .0029 | .0192 | .0242 |
| Reboiler | −144.6 | .9583 | .0006 | .0315 | .0096 | .9501 | .0047 | .0100 | .0352 [2] |

*Includes the mole fraction of $CO_2$ that will form solids.
**Higher hydrocarbons
[1] Vapor Overhead Product Stream
[2] Liquid Bottom Product Stream Referring to Table I, from approximately −145° to −160° F. (i.e., the lower distillation section) both CO$_2$ and CH$_4$ concentrate in the liquid phase, while N$_2$ concentrates in the vapor phase. Therefore, the liquid bottom product stream becomes enriched with CH$_4$ relative to the tower stream's CH$_4$ concentration. As shown in the bottom line of Table I, the liquid bottom product stream is comprised of approximately 95% CH$_4$, 3.5% CO$_2$, 1% N$_2$, and ½% other higher hydrocarbons. As illustrated by FIG. 3, the large vapor/liquid region from −140° to −160° F. indicates how the vapor/liquid equilibrium prevails over a relatively wide range of CO$_2$ concentrations throughout the lower distillation section without solids formation.

From approximately −160° to −170° F. (i.e., the freezing zone section) the vapor and liquid phases are comprised of CH$_4$, N$_2$, and some CO$_2$ while the solid phase is exclusively comprised of CO$_2$. The CO$_2$ mole fractions in the solid phase are not specifically identified in Table I. However, for stages 10-12 (i.e., the CFZ) the CO$_2$ mole fractions in the vapor and liquid phases also include the mole fractions of CO$_2$ that will form in the solid phase. The amount of CO$_2$ in the solid phase depends on a variety of factors including tower conditions, feed stream composition, and flow rates. From approximately −170° to −230° F. (i.e., the upper distillation section) any CO$_2$ present will concentrate primarily in the liquid phase. As in the lower distillation section, CH$_4$ obtains higher concentrations in the liquid phase relative to the vapor phase while the opposite effect is observed with N$_2$. As shown in the top line of Table I, the vapor overhead product stream is comprised of approximately 10% CH$_4$ and 90% N$_2$ and trace amounts of CO$_2$ and other hydrocarbons.

Prior to the present invention, it was well understood by those skilled in the art that solidification of a freezable component could be controlled in the freezing zone 108 so as to avoid plugging the tower. In addition, it was well understood that at temperatures above the freezable component's freezing point, the freezable component could be maintained in a liquid-vapor equilibrium without its freezing in the lower distillation section 106. It was unanticipated, however, that significantly high concentrations (i.e., >0.1 mole % but less than the CMP) of a freezable component could be maintained in the lower distillation section 106 without solids formation at temperatures well below the freezable component's freezing point at typical column conditions. This tolerance for high concentrations of a freezable component in the tower's lower distillation section can reduce the cost of many cryogenic separation processes. In the specific case of nitrogen rejection, this tolerance significantly expands the maximum CO$_2$ concentration previously tolerated with conventional NRU technology (i.e., less than 0.1 mole %), thereby reducing the cost of operating the NRU.

As a result, CFZ technology can be used to separate high volatility components from each other in the presence of a lower volatility freezable component. Thus, CFZ technology may be used to simultaneously separate a freezable component of relatively low volatility (e.g., CO$_2$, H$_2$S, benzene) and CH$_4$ from a high volatility component (e.g., N$_2$), whereby the freezable component and CH$_4$ are separated out as a liquid in a single splitter tower without freezing of the freezable component.

A preferred apparatus and method of practicing the invention have been described. It is to be understood that the foregoing is illustrative only and that other means and techniques can be employed without departing from the true scope of the invention defined in the following claims.

What is claimed is:

1. A separation process comprising the steps of:
   (a) introducing a multi-component feed stream into a separation system having a lower distillation section and a freezing zone, said multi-component feed stream containing at least
      (i) a first component,
      (ii) a second component having a relative volatility greater than that of said first component, and
      (iii) a third component having a relative volatility less than that of said first component;
   (b) producing in said lower distillation section a liquid bottom product stream enriched in said first component and a freezing zone vapor feed stream;
   (c) introducing said freezing zone vapor feed stream into said freezing zone;
   (d) contacting said freezing zone vapor feed stream in said freezing zone with a freezing zone liquid feed stream;
   (e) forming in said freezing zone solids of said third component, a freezing zone liquid product stream, and a freezing zone vapor product stream enriched in said second component;
   (f) collecting said solids of said third component and said freezing zone liquid product stream at the bottom of said freezing zone;
   (g) melting at least a portion of the collected solids to produce a liquid mixture with said freezing zone liquid product stream and introducing said liquid mixture into said lower distillation section;
   (h) condensing at least a portion of said freezing zone vapor product stream to form said freezing zone liquid feed stream; and
   (i) recovering at least a portion of said freezing zone vapor product stream.

2. The process of claim 1 wherein said multi-component feed stream is introduced into said freezing zone of said separation system.

3. The process of claim 1 wherein said multi-component feed stream is introduced into said lower distillation section of said separation system.

4. The process of claim 1 additionally comprising reboiling a portion of said liquid bottom product stream to form a reboiled vapor feed stream and introducing said reboiled vapor feed stream into said lower distillation section.

5. the process of claim 1 additionally comprising introducing said freezing zone vapor product stream into an upper distillation section engineered to produce a vapor overhead product stream further enriched in said second component of said multi-component feed stream.

6. The process of claim 5 additionally comprising condensing at least a portion of said vapor overhead product stream to form a reflux liquid feed stream and introducing said reflux liquid feed stream into said upper distillation section.

7. A separation process comprising the steps of:
   (a) introducing a multi-component feed stream into a separation system having a lower distillation system and a freezing zone, said multi-component feed stream containing at least
      (i) methane (ii) a high volatility component having a relative volatility greater than that of methane, and (iii) a freezable component having a relative volatility less than that of methane;

(b) producing in said lower distillation section a liquid bottom product stream enriched in methane and a freezing zone vapor feed stream;

(c) introducing said freezing zone vapor feed stream into said freezing zone;

(d) contacting said freezing zone vapor feed stream in said freezing zone with a freezing zone liquid feed stream;

(e) forming in said freezing zone solids of said freezable component, a feeezing zone liquid product stream, and a freezing zone vapor product stream enriched in said high volatility component;

(f) collecting said solids of said freezable component at the bottom of said freezing zone;

(g) melting at least a portion of the collected solids to produce a liquid mixture with said freezing zone liquid product stream and introducing said liquid mixture into said lower distillation section;

(h) condensing at least a portion of said freezing zone vapor product stream to form said freezing zone liquid feed stream; and (i) recovering at least a portion of said freezing zone vapor product stream.

8. The process of claim 7 wherein said multi-component feed stream is introduced into said freezing zone of said separation system.

9. The process of claim 7 wherein said multi-component feed stream is introduced into said lower distillation section of said separation system.

10. The process of claim 7 additionally comprising reboiling a portion of said liquid bottom product stream to form a reboiled vapor feed stream and introducing said reboiled vapor feed stream into said lower distillation section.

11. The process of claim 7 additionally comprising introducing said freezing zone vapor product stream into an upper distillation section engineered to produce a vapor overhead product stream further enriched in said high volatility component of said multi-component feed stream.

12. The process of claim 11 additionally comprising condensing at least a portion of said vapor overhead product stream to form a reflux liquid feed stream and introducing said reflux liquid feed stream into said upper distillation section.

13. A separation process for separating a multi-component feed stream containing at least methane, a high volatility component having relative volatility greater than that of methane, and a freezable component having a relative volatility less than that of methane, said separation process comprising the steps of:

(a) introducing said multi-component feed stream into a splitter tower having a lower distillation section and a freezing zone, (i) said lower distillation section engineered to produce a liquid bottom product stream enriched in a least said methane component of said multi-component feed stream and a freezing zone vapor feed stream, said lower distillation section being operated at a temperature and pressure at which substantially no solids of said freezable component are formed, and (ii) said freezing zone engineered to contact said freezing zone vapor feed stream with at least one freezing zone liquid feed stream at a temperature and pressure whereby said freezable component may freeze forming solids of said freezable component which precipitate to the bottom of said freezing zone resulting in a freezing zone vapor product stream enriched in at least said high volatility component of said multi-component feed stream;

(b) producing said liquid bottom product stream and said freezing zone vapor feed stream in said lower distillation section;

(c) introducing said freezing zone vapor feed stream into said freezing zone;

(d) contacting said freezing zone vapor feed stream in said freezing zone with a freezing zone liquid feed stream;

(e) forming in said freezing zone solids of said freezable component, a freezing zone liquid product stream, and a freezing zone vapor product stream enriched in said high volatility component;

(f) collecting said solids at the bottom of said freezing zone;

(g) melting at least a portion of the collected solids to produce a liquid mixture with said freezing zone liquid product stream and introducing said liquid mixture into said lower distillation section;

(h) condensing at least a portion of said freezing zone vapor product stream to form said freezing zone liquid feed stream; and (i) recovering at least a portion of said freezing zone vapor product stream.

14. The process of claim 13 wherein said multi-component feed stream is introduced into said freezing zone of said separation system.

15. The process of claim 13 wherein said multi-component feed stream is introduced into said lower distillation section of said separation system.

16. The process of claim 13 additionally comprising reboiling a portion of said liquid bottom product stream to form a reboiled vapor feed stream and introducing said reboiled vapor feed stream into said lower distillation section.

17. The process of claim 13 additionally comprising introducing said freezing zone vapor product stream into an upper distillation section engineered to produce a vapor overhead product stream further enriched in said high volatility component of said multi-component feed stream.

18. The process of claim 17 additionally comprising condensing at least a portion of said vapor overhead product stream to form a reflux liquid feed stream and introducing said reflux liquid feed stream into said upper distillation section.

19. A separation process for separating a multi-component feed stream containing at least nitrogen, carbon dioxide, and methane, said separation process comprising the steps of:

(e) introducing said multi-component feed stream into a splitter tower having a lower distillation section and a freezing zone, (i) said lower distillation section engineered to produce a liquid bottom product stream enriched in at least said methane component of said multi-component feed stream and a freezing zone vapor feed stream, said lower distillation section being operated at a temperature and pressure at which substantially no carbon dioxide solids are formed within said lower distillation section, and (ii) said freezing zone engineered to contact said freezing zone vapor feed stream with at least one freezing zone liquid feed stream at a temperature and pressur whereby at least a portion of said carbon dioxide component freezes forming carbon dioxide solids which precipitate to the bottom of said freezing zone resulting in a freezing zone vapor product stream enriched in at least said nitrogen component of said multi-component feed stream;

(b) producing said liquid bottom product stream and said freezing zone vapor feed stream in said lower distillation section;

(c) introducing said freezing vapor feed stream into said freezing zone;

(d) contacting said freezing zone vapor feed stream in said freezing zone with said freezing zone liquid feed stream;

(e) forming in said freezing zone said carbon dioxide solids, a freezing zone liquid product stream, and said freezing zone vapor product steam;

(f) collecting said carbon dioxide solids at the bottom of said freezing zone;

(g) melting at least a portion of the collected solids to produce a liquid mixture with said freezing zone liquid product stream and introducing said liquid mixture into said lower distillation section;

(h) condensing at least a portion of said freezing zone vapor product stream to form a freezing zone liquid feed stream; and (i) recovering at least a portion of said freezing zone vapor product stream.

20. The process of claim 19 wherein said multi-component feed stream is introduced into said freezing zone of said separation system.

21. The process of claim 19 wherein said multi-component feed stream is introduced into said lower distillation seciton of said separation system.

22. the process of claim 19 additionally comprising reboiling a portion of said liquid bottom product stream to form a reboiled vapor feed stream and introducing said reboiled vapor feed stream into said lower distillation section.

23. The process of claim 19 additionally comprising introducing said freezing zone vapor product stream into an upper distillation section engineered to produce a vapor overhead product stream further enriched in said nitrogen component of said multi-component feed stream.

24. The process of claim 23 additionally comprising condensing at least a portion of said vapor overhead product stream to form a reflux liquid feed stream and introducing said reflux liquid feed stream into said upper distillation section.

* * * * *